(12) United States Patent
Anderson (10) Patent No.: US 7,040,028 B2
(45) Date of Patent: May 9, 2006

(54) SYSTEM, APPARATUS AND METHOD FOR ALIGNMENT OF PROPELLER SHAFT SUPPORTS AND ENGINE OF A WATER VESSEL

(76) Inventor: Frederick Anderson, 731 Magellan Dr., Sarasota, FL (US) 34243

(*) Notice: Subject to any disclaimer, the term of this patent is extended or adjusted under 35 U.S.C. 154(b) by 247 days.

(21) Appl. No.: 10/463,889

(22) Filed: Jun. 18, 2003

(65) Prior Publication Data

US 2004/0257569 A1    Dec. 23, 2004

(51) Int. Cl.
  *G01C 15/00* (2006.01)
  *G01B 11/00* (2006.01)
  *G02B 27/28* (2006.01)
  *G02B 5/30* (2006.01)

(52) U.S. Cl. .................. 33/286; 33/DIG. 21; 356/399; 359/495

(58) Field of Classification Search ........ 356/399–401, 356/614, 138–155; 33/281, 286, DIG. 21, 33/DIG. 1, 228, 293; 250/559.29, 559.3; 359/483, 484, 487, 494, 495, 496, 497, 500, 359/515, 529, 618, 629
See application file for complete search history.

(56) References Cited

U.S. PATENT DOCUMENTS

| 4,698,491 | A | | 10/1987 | Lysen |
| 5,144,487 | A | * | 9/1992 | Hersey ....................... 359/629 |
| 5,194,920 | A | | 3/1993 | Mattila |
| 5,481,384 | A | * | 1/1996 | Kramer et al. ................ 359/17 |
| 5,491,555 | A | * | 2/1996 | Romine ...................... 356/399 |
| 6,337,742 | B1 | | 1/2002 | Lysen et al. |
| 6,342,946 | B1 | | 1/2002 | Holstein |
| 6,434,849 | B1 | | 8/2002 | Hermann |
| 6,476,914 | B1 | | 11/2002 | Hoelzl et al. |

* cited by examiner

*Primary Examiner*—Layla G. Lauchman
*Assistant Examiner*—Gordon J. Stock, Jr.
(74) *Attorney, Agent, or Firm*—Charles J. Prescott (57) ABSTRACT

A system, apparatus and method for alignment of a marine engine in a water vessel with either an existing or a design propeller shaft line of a propeller shaft of the vessel. The invention is also useful in positioning and aligning propeller shaft supports to the design shaft line before being secured to the hull of the vessel under construction. A laser gun for projecting a laser beam, a plurality of laser targets positionable into the propeller shaft support members, and a unique laser beam splitter temporarily connected to the engine output shaft cooperate to provide opposing colinear laser output beams viewably emitting from the laser beam splitter only when the marine engine is properly oriented coaxially of the engine crankshaft centerline with respect to the shaft line.

10 Claims, 9 Drawing Sheets

SYSTEM, APPARATUS AND METHOD FOR ALIGNMENT OF PROPELLER SHAFT SUPPORTS AND ENGINE OF A WATER VESSEL

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to devices and methods for properly aligning the propeller shaft support members of a prop shaft connected in driving engagement with a marine engine in a water vessel under construction and for devices and methods associated with proper alignment of the engine mounted in the bed of a hull of a water vessel.

2. Description of Related Art

The use of lasers has become widespread in all aspects of measuring and construction due to the unique well-known features of laser beams. Small laser devices are almost exclusively routinely used in home and building construction for establishing both accurate distance measurements and accurate perpendicularity and parallel relationships between erected surfaces in construction.

A number of prior art disclosures also teach the utilization of lasers to measure and effect establishing proper coaxial, parallel or orthogonal relationships between straight solid or hollow shaft members as follows:

U.S. Pat. No. 6,342,946 to Holstein
U.S. Pat. No. 4,698,491 to Lysen
U.S. Pat. No. 6,476,914 to Hoelzl, et al.
U.S. Pat. No. 6,337,742 to Lysen, et al.
U.S. Pat. No. 6,434,849 to Hermann
U.S. Pat. No. 5,194,920 to Mattila
U.S. Pat. No. 6,515,294 to Busch et al.
U.S. Pat. No. 5,026,998 to Holzl
U.S. Pat. No. 6,040,903 to Lysen et al.
U.S. Pat. No. 6,046,799 to Lysen
U.S. Pat. No. 6,223,102 to Busch
U.S. Pat. No. 5,430,539 to Lysen The Prüftechnik Dieter Busch AG company has developed a number of the above patents, one of which, U.S. Pat. No. 6,342,946, teaches determining the axial position of hollow cylinders through the utilization of a laser beam emitting device. As noted, this invention is suitable especially for measuring shaft tunnels of ships and for laying pipelines.

The majority of the above prior U.S. Patents incorporate mirrors in splitting a beam into either perpendicular or parallel relationship one to another to establish a viewable alignment means with respect to the shaft or tunnel of interest. However, none of the prior teaching appears to disclose the utilization of a laser to project a beam along the design shaft line of a boat during construction or projecting a laser beam accurately colinearly along the same shaft line of an existing vessel and to strike a unique laser beam splitting apparatus which, when attached to the output shaft of the marine engine, will provide very accurate visual data or information as to whether the engine is properly aligned in all degrees of freedom with respect to the hull and the laser beam.

BRIEF SUMMARY OF THE INVENTION

This invention is directed to a system, apparatus and method for alignment of a marine engine in a water vessel with either an existing or a design propeller shaft line of a propeller shaft of the vessel. The invention is also useful in positioning and aligning propeller shaft supports to the design shaft line before being secured to the hull of the vessel under construction. A laser gun for projecting a laser beam, a plurality of laser targets positionable into the propeller shaft support members, and a unique laser beam splitter temporarily connected to the engine output shaft cooperate to provide opposing colinear laser output beams viewably emitting from the laser beam splitter only when the marine engine is properly oriented coaxially of the engine crankshaft centerline with respect to the shaft line.

It is therefore an object of this invention to provide an apparatus for attachment to the output shaft of a marine engine in a water vessel for use in combination with a laser beam projected colinearly along the shaft line of the propeller shaft for accurate and proper engine alignment thereby.

Still another object of this invention is to provide a system including a laser and a laser beam splitter apparatus for use in accurately aligning engines within an existing or under construction marine vessel.

Yet another object of this invention is to provide a method for the accurate positioning and attachment of prop shaft support hardware to be colinear with the design shaft line and the engine propeller shaft of the water vessel under construction.

Another object of this invention is to provide a unique laser beam splitter which produces oppositely extending output laser beams precisely orthogonally to an input laser beam striking the input face of the device.

Yet another object of this invention is to provide a method of properly aligning a marine engine within a water vessel utilizing a laser and a laser beam splitting apparatus attached to the output shaft of the engine after the propeller shaft has been removed.

In accordance with these and other objects which will become apparent hereinafter, the instant invention will now be described with reference to the accompanying drawings.

DETAILED DESCRIPTION OF THE INVENTION

New Installations

Figure 1:
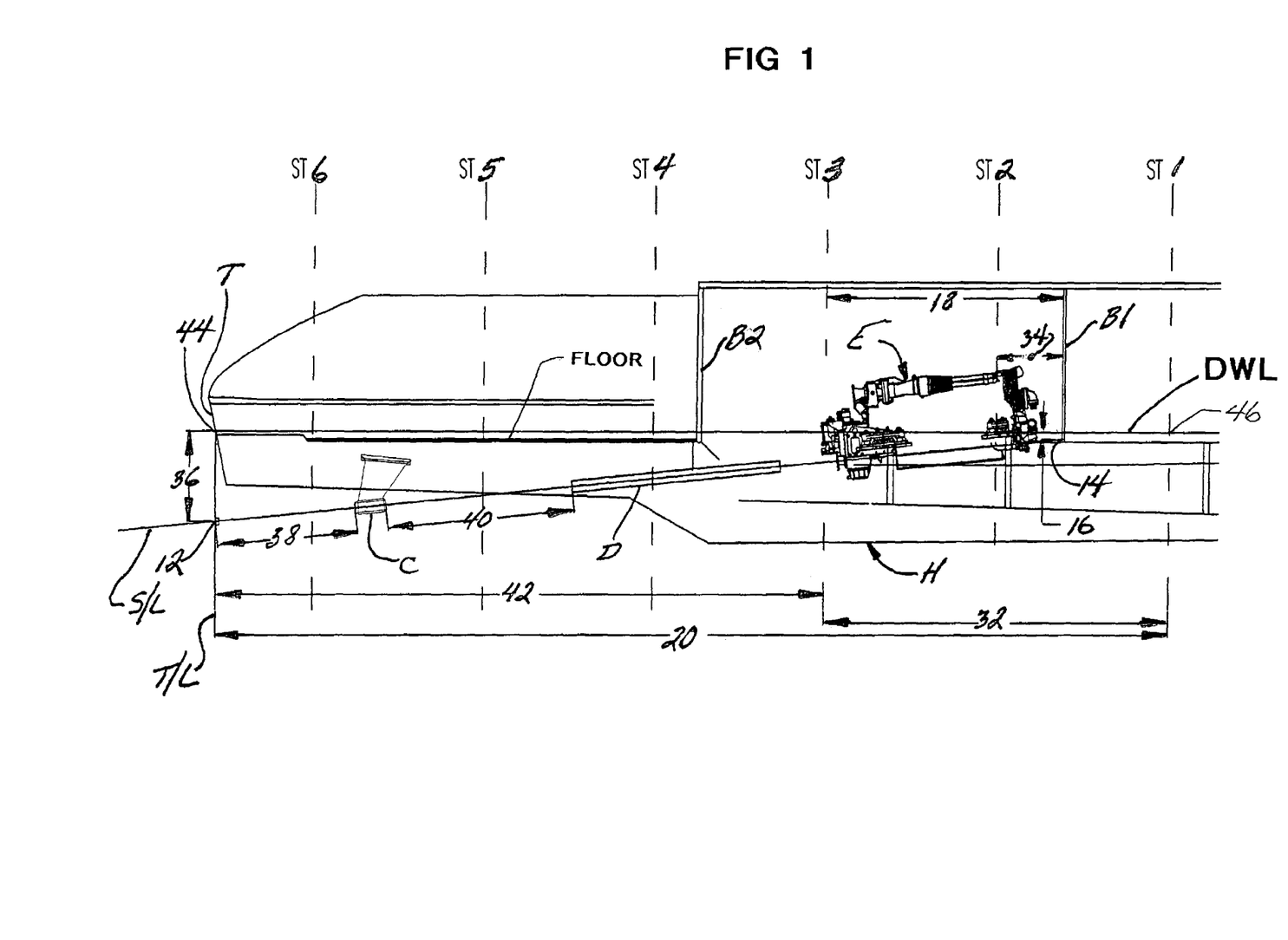
FIG. 1 is a schematic side elevation view of the rear portion of a marine vessel under construction.
Figure 2:
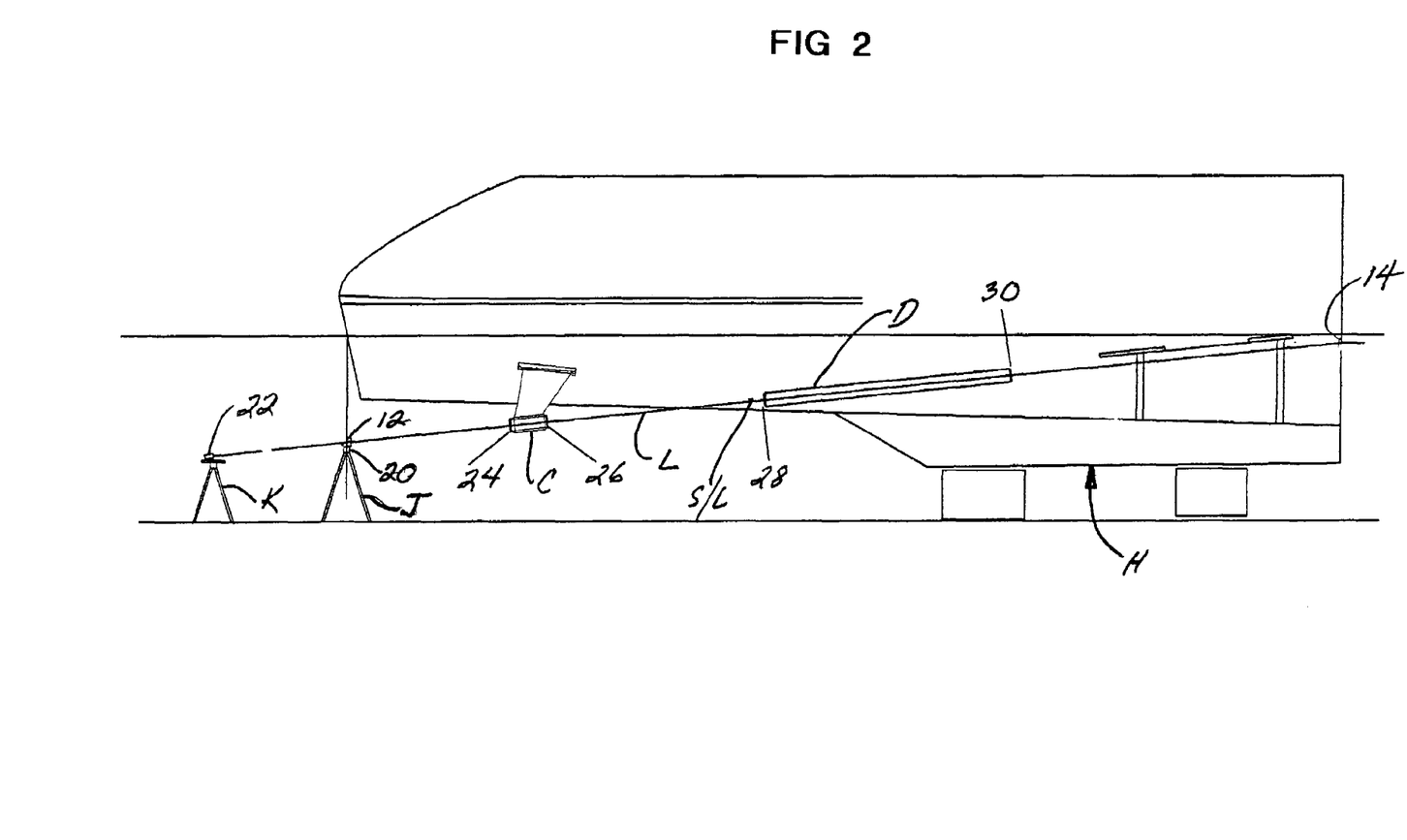
FIG. 2 is a view similar to FIG. 1 showing a laser and laser beam emitted therefrom with respect to the positioning and attachment of the propeller shaft support members.

Referring to FIGS. 1 and 2, during a new hull H construction of a water vessel, after all stringers and structural bulkheads, including forward and aft engine room bulkheads B1 and B2, respectively, are installed and complete, the present invention in one aspect thereof may be utilized to establish proper alignment of engine and driveline supports C and D. The hull H should be level to within ¼" port to starboard and fore and aft. Pick a station ST1 forward of the engine room and one ST2 in the engine room. Using a plumb bob, drop the forward station ST1 location to the floor at 46 using a piece of tape to mark this. This will provide a distance 20 from the forward station ST1 to the transom centerline T/L at 44 at the design water line (DWL). Measure rearward along each side of the hull this dimension 20 and place a mark on a piece of tape. Hold and snap a chalk line transversely between the marks on the transom T. A plumb bob dropped from 44, the transom centerline at DWL, will fall on this mark providing a parallel line to the transom T. From the design drawings, project the shaft line S/L rearward past the transom T. Draw a line from DWL at the transom centerline to the projected shaft line a distance 36. This intersection with shaft line S/L will establish the location for the first laser target 12.

To insure that the bulkhead B1 is per the design drawing, measure from station ST3 in the engine room to the rearward bulkhead B1 and verify this distance 18 to coincide with the design drawing by subtracting the design distance 18 from design distance 32 or by measuring a distance 42 from T/L. Station ST2 may also be used in this same manner by subtracting distance 34 from distance 18 and then subtracting that distance from 32. If the boat is a single screw type, this establishes the shaft line S/L location. If the vessel is a twin screw, measurement from centerline to the buttocks lines at ST4, ST5 and/or ST6 noted in the design drawings will be required.

Figure 8:
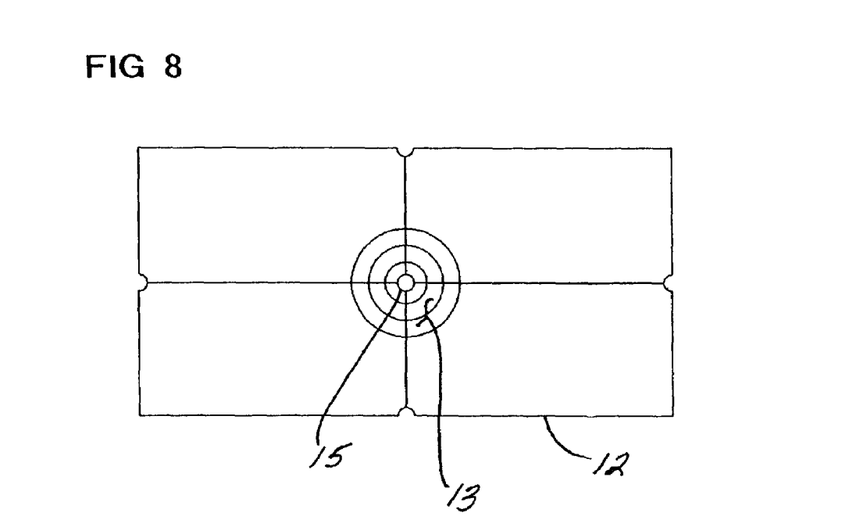
FIG. 8 is a front elevation view of the laser target attached to the laser beam splitter shown in FIGS. 6 and 7.

Referring to FIG. 2, to set the first target 12 having a central aperture 15 and concentric circles 13 there around, as shown in FIG. 8, a 4"×2" aluminum box tube 20 as long as the hull is wide is mounted on tripods J and centered port and starboard on the transom and plumbed to the chalk line using three plumb checks. Measure down from DWL using the dimension 36 from the drawing showing the transom shaft line S/L intersection. Line this up to the center of the leveled aluminum tube 20. The tripods J are used to move the tube 20 up or down to find and establish tube 20 to be level.

Drill a ⅛" hole in the center of the tube 20 using centerline for single screw or the spaced apart buttocks dimension off centerline for twin screw installations. Set the distance 36 from the hole to DWL using the projected shaft line S/L intersection dimension. Use a 1" hole saw to open the ⅛" forward hole in the aluminum to prevent interference with a laser beam. Mount and align target 12 to S/L and attach to the tube 20. Mount the forward engine room bulkhead B1 target 14 a design distance 16 below DWL in FIG. 1 and project the laser beam between the two points. This establishes the shaft line S/L. The laser 22, atop tripod K, properly aligned to project a laser beam L to establish the shaft line S/L is now set to project the laser light beam L along the shaft line S/L and will not need to be moved during the rest of the strut and shaft log installation.

Figure 10:
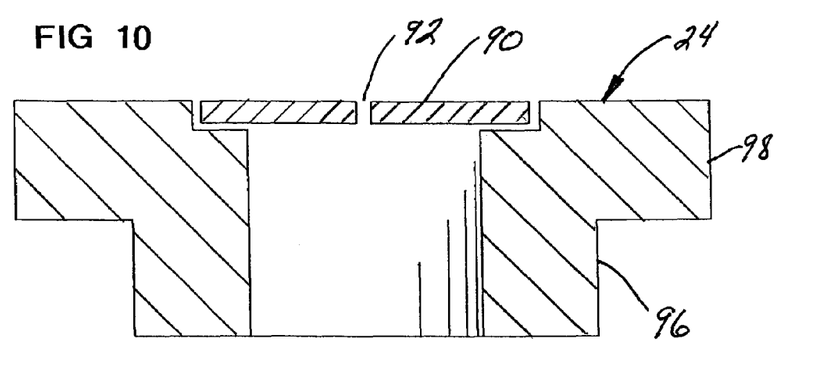
FIG. 10 is a cross section view of a typical propeller shaft support target and support bearing member therefor as shown in front elevation view in FIG. 11.
Figure 11:
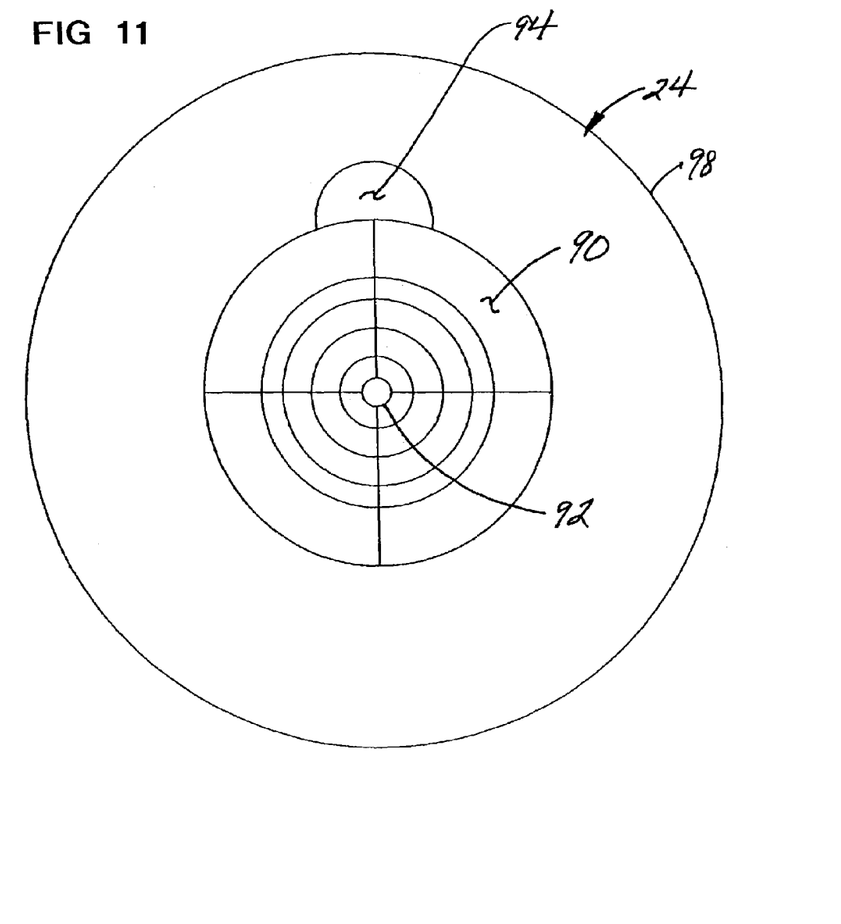

With targets 24, 26, 28 and 30, as shown typically in FIGS. 10 and 11, sized to fit into the ends of the strut C and shaft log D move them with the respective targets in place as shown to adjust each of these struts C and shaft log D until the laser beam L passes through the target holes in each target 24, 26, 28 and 30 and are also spaced apart the design distances 38 and 40.

Aligning Marine Engine(s)

Figure 3:
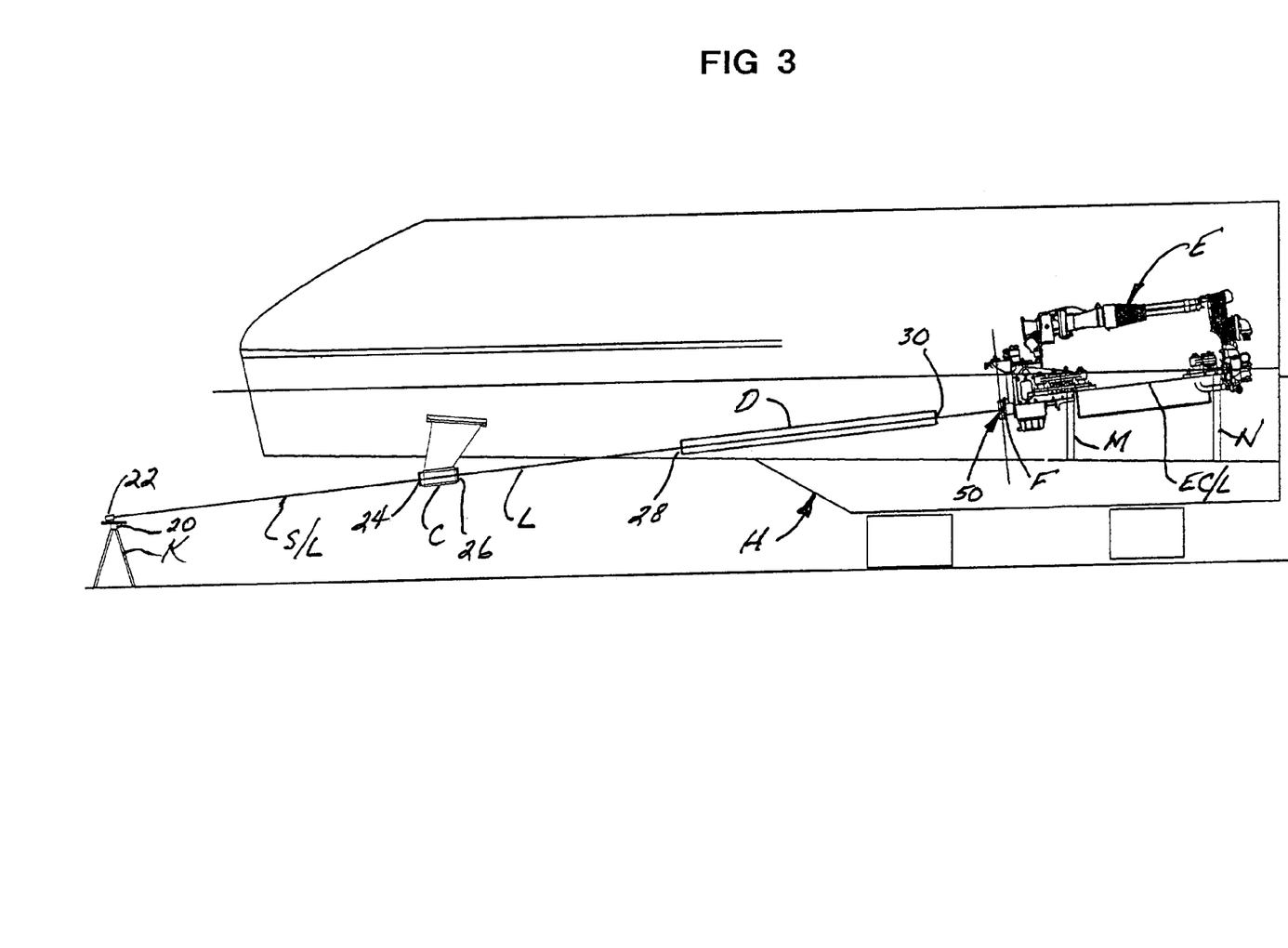
FIG. 3 is a view similar to that of FIG. 2 depicting the utilization of a laser beam splitter to insure proper marine engine alignment within the hull of the water vessel and with respect to the already in place propeller shaft support members.

Referring now to FIG. 3, to confirm proper alignment or to realign an engine centerline E C/L of an engine E already mounted into the hull H of an existing vessel or one under construction as shown in FIGS. 1 and 2, the prop shaft(s) (not shown) are first removed and then targets 24, 26, 28 and 30 are installed into each end of the strut C and shaft log D, respectively, as shown and as previously described. A beam splitter/housing assembly or apparatus is shown generally at numeral 50 and is temporarily rigidly connected to the output flange F of the transmission of the engine E using existing threaded mounting members.

Figure 4:
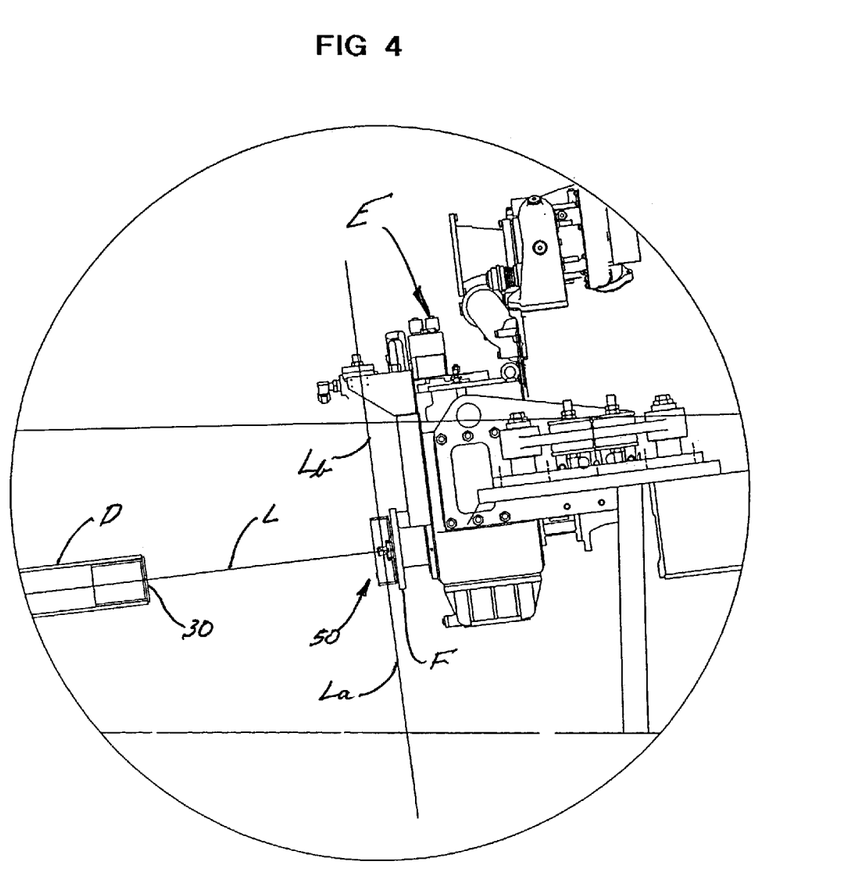
FIG. 4 is an enlargement of a portion of FIG. 3 showing the rear portion of the engine.
Figure 5:
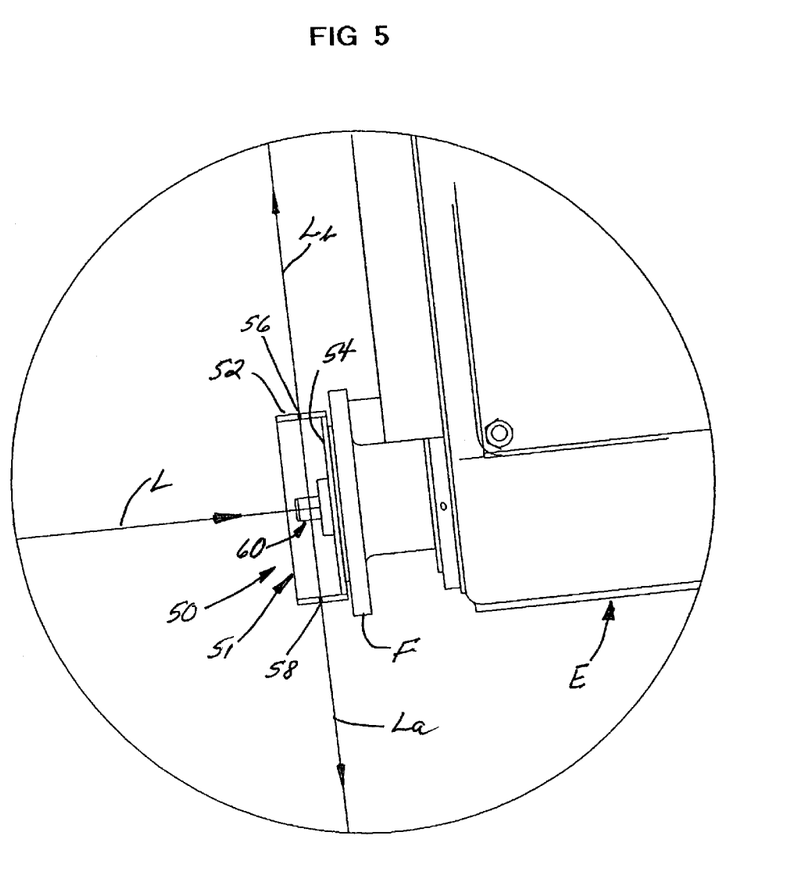
FIG. 5 is a further enlarged view of a rear portion of the engine in FIG. 4 showing the laser beam splitter schematically.

When the laser 22 is properly supported and adjusted on tripod K, the laser beam L passes through each of the targets 24, 26, 28 and 30 in place. As also seen in FIGS. 4 and 5, the laser beam L must properly strike the center of the laser beam splitter 70 as will be described in detail hereinbelow to provide viewable indicia in the form of output beams La and Lb which will only be emitted from apertures 56 and 58 in annular ring 52 when the engine is precisely aligned so that the centerline of the engine E and its output flange F are colinear with laser beam L. To accomplish proper engine E alignment utilizing the apparatus 50, the engine supports M and N are adjusted to reposition the engine E as required in the pitch mode, the yaw mode and vertically and horizontally as aided by the information obtained from the laser beam splitter adapter 70. Again, only when proper alignment is achieved will the output beams La and Lb be seen to emit from apertures 56 and 58.

Referring now to FIGS. 4 to 9, the apparatus 50 and method of the present invention uses a polarizing beam splitter 70 combined with a birefringent retarder 80 and mirror 82 to convert the input laser beam L from the laser 22 into two counter-propagating beams La and Lb orthogonal to the input beam L. The laser beam splitter 70 and birefringent retarder 80 and mirror 82 are rigidly attached together by glue and are securely positioned centrally on plate 54 of housing 51 by support 62. The housing 51 also includes an annular ring 52 as best seen in cross section in FIG. 7 and as described herebelow. A plano-convex objective lens 72 mounted on the input face 84 of the beam splitter 70 brings the two output beams La and Lb to a well-defined focus. A 150 mm focal length lens cemented in place against the input surface 84 is preferred.

The beam splitter 70 has a cube shape formed of two mating glued together prisms 74 and 76 with an optical coating on one of the internal prism surfaces 74a or 76a to define a partially reflective hypotenuse surface 78. The hypotenuse surface 78 is coated with an antireflection (AR) dielectric coating which transmits light with a P-polarization while reflecting the portion of light with an S-polarization. When the linearly polarized beam L is directed into the beam splitter 70 through a central aperture 68 at the center of concentric target circles 66 of target 64 of a laser beam splitter target assembly 60 and lens 72 at an angle of polarization of 45° with respect to the input face 84, approximately 50% of the light will transmit directly through the cube 70 as Lc in FIG. 9. The remaining light will be reflected at 90° at La. The reflected beam La composes one of the two output beams of the beam splitter 70.

Birefringence

Birefringence generally refers to the unique capability of a material or device to exhibit two indexes of refraction, one index for the two directions that are the same and the other for the direction along which the molecular structure is spaced differently. Crystalline materials may have different indexes of refraction associated with different crystallographic directions which produces the birefringence feature. Birefringent materials or members are used widely in optics to produce polarizing prisms and retarder plates such as a quarter-wave plate. Putting such a birefringent material between crossed polarizers can give rise to interference colors. Examples of birefringent materials which exhibit two indexes of refraction are:

Tourmaline
Calcite
Quartz
Sodium Nitrate
Ice
Rutile (TiO 2)

Figure 9:
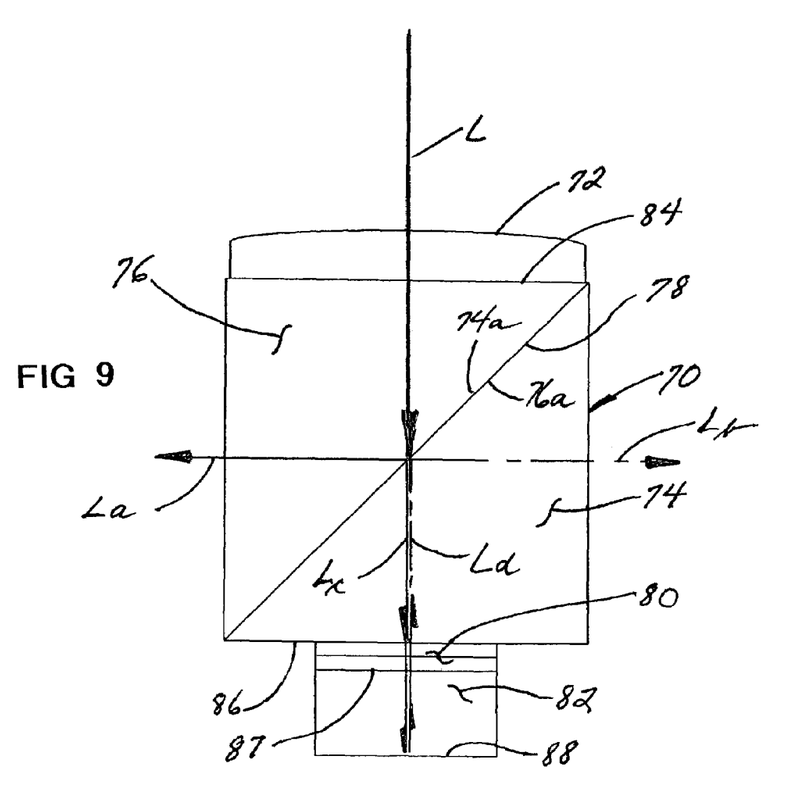
FIG. 9 is an enlarged side view of the laser beam splitter useful generally absent the support housing.

A phase retarder 80 (birefringent waveplate) with a retardance of one-quarter wave at the operating wavelength is mounted by gluing against one side of the cube 70 where the transmitted beam Lc would otherwise exit from the mounting face 86. This waveplate 80 is oriented so that the fast axis is rotated 45° with respect to the angle of polarization of the output beam. In this configuration, the linearly polarized transmitted beam portion Lc is converted to a circularly polarized beam which is either left or right handed orientation depending on the orientation of the waveplate 80—the device will work either way. A zero-order 532 mm quarter waveplate is preferred which is cemented to the output face 86.

A 100% reflecting mirror 82 is mounted by cementing against the waveplate 80 so that the circularly polarized beam strikes mirrored surface 88 at normal incidence. The reflected beam Ld experiences a 180° phase shift off this mirror and returns along the same path of propagation as it arrived. When this beam travels back through the waveplate 80, it undergoes another quarter wave phase shift converting the circularly polarized beam back to a linearly polarized beam Ld; however, now the polarization is rotated 90°. This, in effect, converts the p-polarized beam to an s-polarized beam Ld. A broadband dielectric mirror cemented to the phase retarder 80 was used in prototype construction; however, production units will utilize an HR reflective coating cemented to surface 87 of the phase retarder 80.

When the return beam Ld reaches the beam splitter hypotenuse 78, the direction of propagation is reflected 90° in a direction directly opposite from the first reflected beam La. Since one of the prism hypotenuses 74a or 76a is AR coated, the second output beam Lb reflects off the same surface 78 as the first, insuring that the two output beams La and Lb are both co-aligned and counter propagating. To establish this condition, it is necessary that the beam cube entrance and exit faces or surfaces 84 and 86 are parallel and that the waveplate 80 and mirror 82 surfaces are normal to the transmitted beam Lc. This is handled through maintaining tight fabrication and alignment tolerances on all the optical surfaces.

Figure 6:
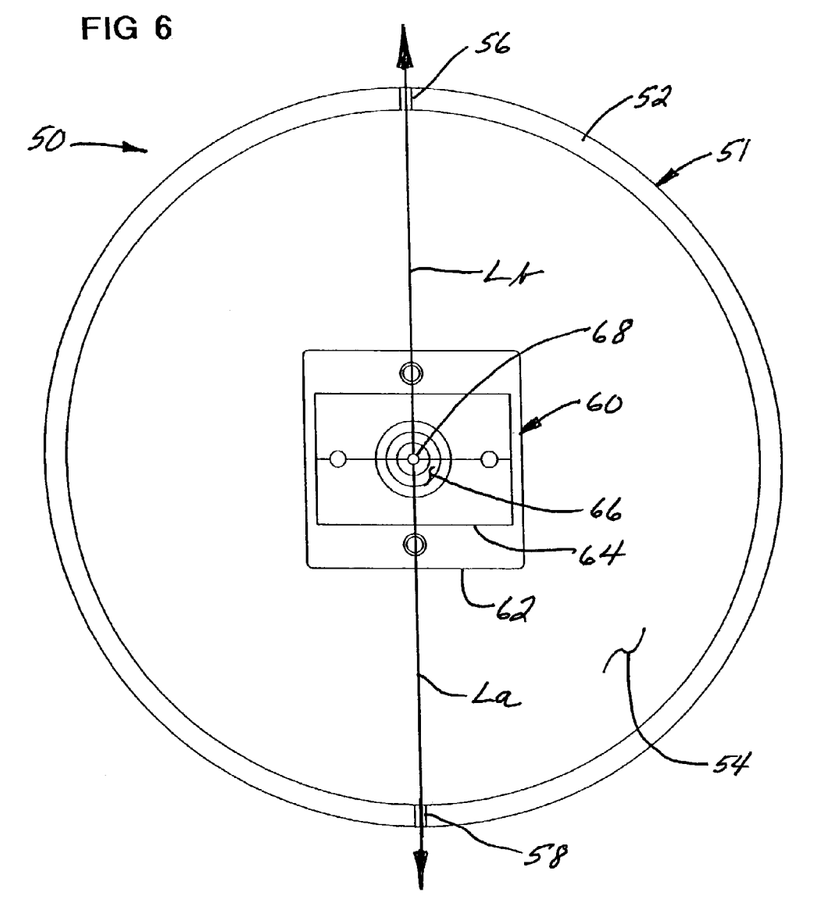
FIG. 6 is a front elevation view of the laser beam splitter.
Figure 7:
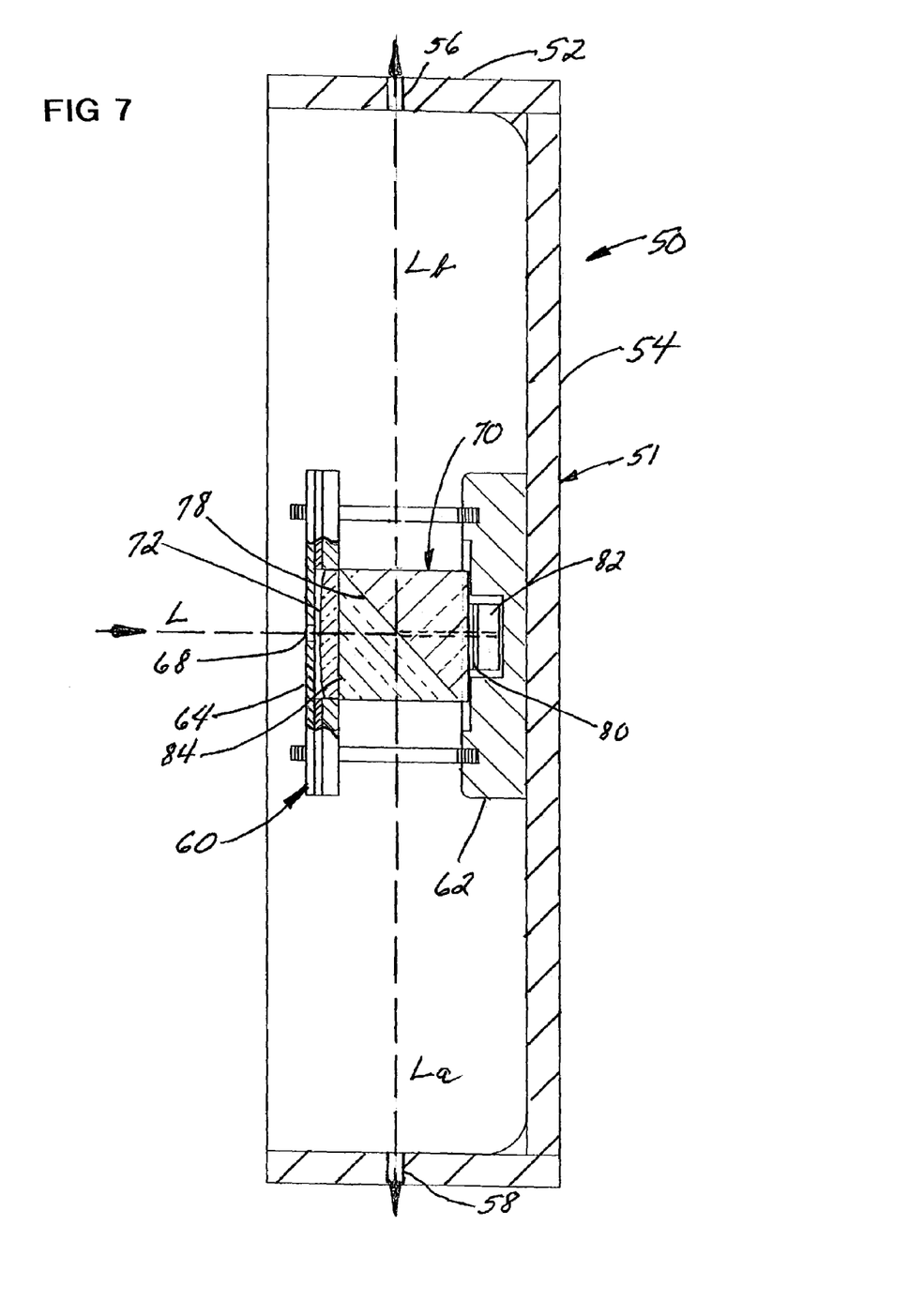
FIG. 7 is a side elevation section view of FIG. 6.

Referring particularly to FIGS. 5, 6 and 7, the laser beam L strikes the objective lens 72 only when the laser beam is aligned properly to fully pass through the laser splitter target aperture 68. This insures a generally accurate normal or orthogonal relationship between the laser beam L and the input face 84 of the laser beam splitter 70. As described hereinabove, the laser beam L is split into two output beams La and Lb. These output beams La and Lb are oriented precisely orthogonally with respect to all faces of the beam splitter 70. Moreover, the exit apertures 56 and 58 formed into the flange 52 are also precision aligned to be orthogonally oriented in both the plan and side elevation views shown in FIGS. 6 and 7. It has been found that a focus length of approximately 5.3" between the centerline of the housing 51 and apertures 56 and 58 is preferred.

Referring now to FIGS. 10 and 11, a typical propeller shaft support target is shown generally at 24 and is similar to targets 26, 28 and 30 in FIGS. 1 through 3 including a rigid cylindrical bushing or bearing 96 sized in diameter to snugly slide into the end of one of the propeller shaft support members C or D as previously described in FIGS. 1 to 3. This housing 24 also includes an enlarged flange 98 to provide a stop or shoulder and a squareness indicator to insure that the bearing surface 96 is properly aligned and not cocked within the cylindrical end surface of the corresponding propeller shaft support C or D.

The propeller shaft support target 90 includes a series of concentric viewable rings and a central aperture 92 formed therethrough. The aperture 92 is sized to just allow the laser beam L projected from the laser 12 as previously described so as to provide viewable indicia on the target surface immediately adjacent to the aperture 92 as to when the laser beam L is not properly aligned and passing directly through the aperture 92. A thumb cavity 94 facilitates easy removal of the target 90 when not in use. Importantly, the concentricity between the cylindrical surface 96 and the laser aperture 92 must be maintained to insure the highest degree of accuracy from the utilization of the present system and methodology for propeller shaft and engine alignment.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An apparatus for use in conjunction with a laser beam emitted from a laser gun during alignment of a marine engine in a water vessel with a propeller shaft line established for a propeller shaft of the vessel, comprising:

a housing having a central portion and a flange portion extending laterally from said central portion;

said central portion having a flat mounting surface which is spaced parallel to another mounting surface of said central portion and being adapted for temporary connection to an output flange of the engine with said mounting surface thereagainst during engine alignment;

a cube-shaped laser beam splitter connected to said central portion and having spaced, flat, parallel input and mounting faces and opposing spaced parallel output faces orthogonal to said input and mounting face;

a beam splitter target connected to said central portion in closely spaced relation and centrally with respect to said input face, said beam splitter target having a central aperture sized in width to allow passage of the laser beam therethrough into said laser beam splitter;

said laser beam splitter receiving the laser beam at said input face after passing through said central aperture and splitting the laser beam into two opposingly extending output beams each of which is emitted orthogonally from each corresponding said output face;

said flange portion including two opposing laser beam exit apertures oriented 180° apart with respect to said central aperture and orthogonally oriented with respect to said output faces whereby, when a laser beam from said laser gun oriented colinearly with the shaft line passes through said laser beam target aperture to strike said input face and the output flange of the marine engine is oriented coaxially with respect to the shaft line, each of said output beams will project through the corresponding said exit aperture to provide visual indicia of proper engine alignment.

2. An apparatus as set forth in claim 1 wherein said laser beam splitter includes:

two transparent prisms connected together along a hypotenuse surface of each said prism, said hypotenuse surface oriented at 45° with respect to said input face and having an anti-reflecting dielectric coating thereon which will reflect a portion of light of the laser beam as one of said output beams, a remainder of light of the laser beam being transmitted directly to said mounting face;

a birefringent wave plate connected on a first surface thereof against said mounting face and a reflecting mirror connected on a transparent surface thereof against a second surface of said birefringent wave plate, said second surface being parallel to said first surface;

said birefringent waveplate and reflecting mirror cooperatively acting upon the transmitted beam portion to reflect it back against said hypotenuse surface and being reflected therefrom at 45° to form the other said output beam emitted from the other corresponding output face.

3. An apparatus as set forth in claim 2, further comprising:

a plano-convex objective lens connected to said input face which enhances the focus of the laser beam and the output beams.

4. A system for alignment of a marine engine in a water vessel with a propeller shaft line being pre-established by propeller shaft support members for a propeller shaft of the vessel, comprising:

a laser gun for projecting a laser beam;

a plurality of targets each of which is releasably positionable into one end of each of the propeller shaft support members, each said shaft support target having a laser beam aperture formed therethrough sized in width to allow said laser beam to pass therethrough whereby the laser beam being oriented to pass through all of said shaft support target apertures is colinear with the shaft line;

a housing having a central portion and a flange portion extending laterally from said central portion;

said central portion having a flat mounting surface which is spaced parallel to another mounting surface of said central portion and being adapted for temporary connection to an output flange of the engine with said mounting surface thereagainst during engine alignment;

a laser beam splitter connected to said central portion and having spaced, flat, parallel input and mounting faces and opposing spaced parallel output faces orthogonal to said input and mounting face;

a beam splitter target connected to said central portion in closely spaced relation and centrally with respect to said input face, said beam splitter target having a central aperture sized in width to allow passage of the laser beam therethrough into said laser beam splitter;

said laser beam splitter receiving the laser beam at said input face after passing though said central aperture and splitting the laser beam into two opposingly extending output beams each of which is emitted orthogonally from each corresponding said output face;

said flange portion including two opposing laser beam exit apertures oriented 180° apart with respect to said central aperture and orthogonally oriented with respect to said output faces whereby, when a laser beam from said laser gun oriented colinearly with the shaft line passes through said laser beam target aperture to strike said input face and the output flange of the marine engine is oriented coaxially with respect to the shaft line, each of said output beams will project though the corresponding said exit aperture to provide visual indicia of proper engine alignment.

5. An apparatus as set forth in claim 4, wherein said laser beam splitter includes:

two transparent prisms connected together along a hypotenuse surface of each said prism, said hypotenuse surface oriented at 45° with respect to said input face and having an anti-reflecting dielectric coating thereon which will reflect a portion of light of the laser beam as one of said output beams, a remainder of light of the laser beam being transmitted directly to said mounting face;

a birefringent wave plate connected on a first surface thereof against said mounting face and a reflecting mirror connected on a transparent surface thereof against a second surface of said birefringent wave plate, said second surface being parallel to said first surface;

said birefringent waveplate and reflecting mirror cooperatively acting upon the transmitted beam portion to reflect it back against said hypotenuse surface which reflects it at 45° therefrom to form the other said output beam emitted from the other corresponding output face.

6. An apparatus as set forth in claim 5, further comprising:

a plano-convex objective lens connected to said input face which enhances the focus of the laser beam and output beams.

7. A method of aligning a marine engine in a water vessel with a propeller shaft line being pre-established by propeller shaft support members for a propeller shaft of the vessel, comprising the steps of:

(A) providing a plurality of propeller shaft support targets and installing each into one end of each of the propeller shaft support members, each of said shaft support targets having a laser beam aperture formed centrally therethrough sized in width to allow passage of a laser beam therethrough and whereby the laser beam, being oriented to pass through all of said shaft support target apertures of installed said shaft support targets, is colinear with the shaft line;

(B) providing and supporting a laser gun and projecting the laser beam therefrom in colinear alignment with the shaft line and concentrically through each said aperture of each of said shaft support targets;

(C) providing a housing having a central portion and a flange portion extending laterally from said central portion, said central portion having a flat mounting surface which is spaced parallel to another mounting surface of said central portion and connecting said central portion to an output flange of the engine with said mounting surface against the output flange during engine alignment;

(D) providing a laser beam splitter connected to said central portion and having spaced, flat, parallel input and mounting faces and opposing spaced parallel output faces orthogonal to said input and mounting face, a beam splitter target being connected to said central portion in closely spaced relation and centrally with respect to said input face, said beam splitter, target having a central aperture sized in width to allow passage of the laser beam therethrough into said laser beam splitter;

(E) receiving the laser beam at said input face after passing through said central aperture and splitting the laser beam into two opposingly extending output beams each of which is emitted orthogonally from each corresponding said output face;

(F) aligning the engine to be oriented in coaxial alignment with shaft line, said flange portion including two opposing laser beam exit apertures oriented 180° apart with respect to said central aperture and orthogonally oriented with respect to said output faces whereby, when a laser beam from said laser gun oriented colinearly with the shaft line passes through said laser beam target aperture to strike said input face, and the output flange of the marine engine is oriented coaxially with respect to the shaft line, each of said output beams will viewably project through the corresponding said exit aperture to provide visual indicia of proper engine alignment.

8. A method of aligning propeller shaft supports and a marine engine in a water vessel under construction with a design propeller shaft line for a propeller shaft of the vessel, comprising the steps of:

(A) providing a plurality of propeller shaft support targets and installing each into one end of each of the propeller shaft support members, each said shaft support target having a laser beam aperture formed concentrically therethrough sized to allow passage of a laser beam therethrough;

(B) providing and supporting a laser gun for projecting a laser beam colinearly with the design shaft line;

(C) adjustably moving each of the propeller shaft supports so that the laser beam passes through all of said shaft support target apertures simultaneously and rigidly attaching the propeller shaft supports to the hull in the aligned positions;

(D) providing a housing having a central portion and a flange portion extending laterally from said central portion, said central portion having a flat mounting surface which is spaced parallel to another mounting surface of said central portion connecting said central portion to an output flange of the engine with said mounting surface against the output flange during engine alignment;

(E) providing a laser beam splitter being connected to said central portion and having spaced, flat, parallel input and mounting faces and opposing spaced parallel output faces orthogonal to said input and mounting face, a beam splitter target being connected to said central portion in closely spaced relation and centrally with respect to said input face, said beam splitter target having a central aperture sized in width to allow passage of the laser beam therethrough into said laser beam splitter;

(F) receiving the laser beam at said input face after passing through said central aperture and splitting the laser beam into two opposingly extending output beams each of which is emitted orthogonally from each corresponding said output face;

(G) aligning the engine into the design orientation in coaxial alignment with the design shaft line, said flange portion including two opposing laser beam exit apertures oriented 180° apart with respect to said central aperture and orthogonally oriented with respect to said output faces whereby, when a laser beam from said laser gun oriented colinearly with the shaft line passes through said laser beam target aperture to strike said input face and the output flange of the marine engine is oriented coaxially with respect to the shaft line, each of said output beams will project through the corresponding said exit aperture to provide visual indicia of proper engine alignment.

9. An apparatus for use in conjunction with a laser beam emitted from a laser gun, comprising:

a stationary cube-shaped laser beam splitter having spaced, flat, parallel input and mounting faces and opposing spaced parallel output faces orthogonal to said input and mounting face;

a plano-convex objective lens mounted on said input face for focusing the laser beam before entering into said laser beam splitter;

said laser beam splitter including two mating prisms attached together along mating hypotenuse surfaces, a dielectric coating being one of said hypotenuse surfaces and defining a partially reflective hypotenuse surface oriented at 45° to said input face;

said laser beam splitter receiving the focused laser beam at said input face and splitting the laser beam at said partially reflective hypotenuse surface into a first output beam (La) which is reflected from said partially reflective hypotenuse surface and emitted orthogonally from one said output face and a transmitted beam portion (Lc) passing straight through said partially reflective hypotenuse surface;

a flat birefringent waveplate (80) mounted on one surface thereof directly against said mounting face (86) and a substantially fully reflective mirror (82) mounted directly against another surface of said birefringent waveplate which is parallel to said one surface;

said birefringent waveplate and mirror cooperating to reflect the transmitted beam portion (Lc) directly back through said birefringent waveplate and against said partially reflective hypotenuse surface to produce a second output beam (Lb) emitted orthogonally from the other said output face and colinear to and oppositely directed from said first output beam.

10. An apparatus as set forth in claim 9, further comprising:

two opposing laser beam exit apertures oriented 180° apart with respect to said central aperture and orthogonally oriented with respect to said output faces whereby, when a laser beam strikes said input face, each of said output beams will project orthogonally from each corresponding output face and through the corresponding said exit aperture to provide visual indicia that the laser beam is oriented orthogonally to said in put and mounting faces.

* * * * *